United States Patent
Benke et al.

(10) Patent No.: US 10,942,789 B2
(45) Date of Patent: Mar. 9, 2021

(54) PERFORMANCE-BASED REALLOCATING OF LOGICAL PROCESSING UNITS TO SOCKETS OF A COMPUTER SYSTEM

(71) Applicant: INTERNATIONAL BUSINESS MACHINES CORPORATION, Armonk, NY (US)

(72) Inventors: Oliver Benke, Boeblingen (DE); Hartmut E. Penner, San Jose, CA (US); Klaus Theurich, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/538,935

(22) Filed: Aug. 13, 2019

(65) Prior Publication Data
US 2019/0361752 A1 Nov. 28, 2019

Related U.S. Application Data

(63) Continuation of application No. 15/941,189, filed on Mar. 30, 2018, now Pat. No. 10,592,294, which is a (Continued)

(51) Int. Cl.
*G06F 9/50* (2006.01)
*G06F 12/084* (2016.01)
(Continued)

(52) U.S. Cl.
CPC .......... *G06F 9/5077* (2013.01); *G06F 9/5044* (2013.01); *G06F 11/3433* (2013.01);
(Continued)

(58) Field of Classification Search
CPC .............. G06F 9/45558; G06F 9/5077; G06F 2009/45583; G06F 11/3466;
(Continued)

(56) References Cited

U.S. PATENT DOCUMENTS 6,006,248 A * 12/1999 Nagae ................... G06F 9/5083
709/202
6,189,112 B1 2/2001 Slegel et al.
(Continued)

OTHER PUBLICATIONS

Dybdahl et al., "A Cache-Partitioning Aware Replacement Policy for Chip Multiprocessors", High Performance Computing—HiPC 2016, 13th International Conference, vol. 4297, Dec. 18-21, 2006 (pp. 22-34).

(Continued)

*Primary Examiner* — Dong U Kim
(74) *Attorney, Agent, or Firm* — William A. Kinnaman Jr., Esq.; Kevin P. Radigan, Esq.; Heslin Rothenberg Farley & Mesiti P.C.

(57) ABSTRACT

A multiprocessor computer system facility is provided for selectively reallocating a logical processing unit. The logical processing unit is one logical processing unit of multiple logical processing units backed by a socket of a plurality of sockets of a multiprocessor computer system. The selectively reallocating includes: monitoring, during execution of program code, a performance metric of a hardware resource of the socket, the hardware resource being shared by the multiple logical processing units; and reassigning the logical processing unit, based on the monitoring, to a different socket of the plurality of sockets of the multiprocessor computer system to, in part, improve the performance metric of the hardware resource of the socket. The reassigning includes reassigning the logical processing unit based on the monitoring determining that a differential between a (Continued)

resource utilization rate of the socket and a resource utilization rate of the different socket exceeds a set threshold.

18 Claims, 11 Drawing Sheets

Related U.S. Application Data continuation of application No. 15/297,274, filed on Oct. 19, 2016, now Pat. No. 10,095,550.

(51) Int. Cl.
| | |
|---|---|
| *G06F 12/0842* | (2016.01) |
| *G06F 11/34* | (2006.01) |
| *G06F 11/30* | (2006.01) |
| *G06F 11/20* | (2006.01) |

(52) U.S. Cl.
CPC ........ *G06F 11/3466* (2013.01); *G06F 12/084* (2013.01); *G06F 12/0842* (2013.01); *G06F 11/203* (2013.01); *G06F 11/3024* (2013.01); *G06F 2201/815* (2013.01); *G06F 2212/1016* (2013.01); *G06F 2212/152* (2013.01); *G06F 2212/62* (2013.01)

(58) Field of Classification Search
CPC ......... G06F 2209/501; G06F 2212/152; G06F 2212/2542; G06F 9/5033; G06F 9/508; G06F 9/5083; G06F 9/5044; G06F 12/084; G06F 2212/62

See application file for complete search history.

(56) References Cited

U.S. PATENT DOCUMENTS

| | | | |
|---|---|---|---|
| 7,698,531 | B2 | 4/2010 | Flemming et al. |
| 7,886,299 | B2 | 2/2011 | Kitamura |
| 9,213,652 | B1 | 12/2015 | Miao et al. |
| 10,095,550 | B2 | 10/2018 | Benke et al. |
| 10,133,602 | B2 | 11/2018 | Harris et al. |
| 2009/0070563 | A1 | 3/2009 | Conklin |
| 2009/0198946 | A1 | 8/2009 | Ebata |
| 2010/0251234 | A1 | 9/2010 | Oshins |
| 2011/0083134 | A1* | 4/2011 | Song .............. G06F 9/5077 718/104 |
| 2011/0296406 | A1 | 12/2011 | Bhandari |
| 2011/0296407 | A1 | 12/2011 | Bhandari |
| 2011/0320726 | A1 | 12/2011 | Noda et al. |
| 2012/0265882 | A1 | 10/2012 | Hatasaki |
| 2013/0167146 | A1 | 6/2013 | Dong |
| 2013/0275585 | A1 | 10/2013 | Santhanakrishnan et al. |
| 2013/0346470 | A1 | 12/2013 | Obstfeld et al. |
| 2015/0347166 | A1 | 12/2015 | Noel |
| 2016/0085571 | A1* | 3/2016 | Kim .................. G06F 9/48 718/1 |
| 2017/0177397 | A1 | 6/2017 | Gao |
| 2018/0225154 | A1 | 8/2018 | Benke et al. |

OTHER PUBLICATIONS

Drepper, Ulrich, "What Every Programmer Should Know About Memory", RedHat, Inc., https://www.akkadia.org/drepper/cpumemory.pdf, published Nov. 21, 2007 (114 pages).

Anselm, Phil, "Get More from z/OS by Optimizing HiperDispatch", IBM Systems Magazine, Nov. 2011 (4 pages).

Willhalm et al, "Intel Performance Counter Monitor—A Better Way to Measure CPU Utilization", INTEL Corporation, http://www.intel.com/software/pcm, Aug. 16, 2012 (15 pages).

Vaupel, Robert, "High Availability and Scalability of Mainframe Environments", KIT Scientific Publishing, ISBN 978-3-7315-0022-3 (2013) (346 pages).

IBM Corporation, "z/Architecture Principles of Operation," IBM® Publication No. SA22-7832-10, Eleventh Edition, Mar. 2015, pp. 1-1732.

IBM Corporation, "Power ISA™ Version 2.07B," International Business Machines Corporation, Apr. 9, 2015, pp. 1-1527.

IBM Corporation, "IBM: VM Performance Tips: Using CPU Measure Facility Host Counters", http://www.vm.ibm.com/perf/tips/cpumf.html, downloaded Sep. 19, 2016 (6 pages).

Benke et al., "List of IBM Patents and Patent Applications Treated as Related", U.S. Appl. No. 16/538,935, filed Aug. 13, 2019, dated Aug. 13, 2019 (2 pages).

* cited by examiner

PERFORMANCE-BASED REALLOCATING OF LOGICAL PROCESSING UNITS TO SOCKETS OF A COMPUTER SYSTEM

BACKGROUND

An operating system may view a processor as a logical processor or logical processing unit. The logical processor is backed by a certain socket or physical processor. The physical assignment of processors is typically determined when a machine is powered and initialized, before the operating system is loaded. Normally, once the assignment of logical-to-physical processors is made, the assignment is not modified.

However, under certain stringent conditions, the assignment of logical-to-physical processors can be modified. In particular, if a physical processor fails, the assignment can be modified, assuming a spare processor exists within the processing environment. Specifically, in situations of a failed physical processor, the assignment may be modified, such that the spare processor, instead of the failed processor, backs the logical processor(s).

SUMMARY

Certain shortcomings of the prior art are overcome and additional advantages are provided through the provision of a computer-implemented method, which includes: reallocating a logical processing unit within a multiprocessor computer system, the logical processing unit being one logical processing unit of multiple logical processing units backed by a socket of a plurality of sockets of the multiprocessor computer system, the reallocating including: monitoring, during execution of program code of the multiple logical processing units, a performance metric of a hardware resource of the socket, the hardware resource being shared by the multiple logical processing units; and reassigning the logical processing unit, based on the monitoring, to a different socket of the plurality of sockets of the multiprocessor computer system to, in part, improve the performance metric of the hardware resource of the socket. The reassigning includes reassigning the logical processing unit based on the monitoring determining that a differential between a resource utilization rate of the socket and a resource utilization rate of the different socket exceeds a set threshold.

In another aspect, a system for reallocating processing units is provided which includes a memory, and a processing circuit communicatively coupled with the memory. The system performs a method, including: reallocating a logical processing unit within a multiprocessor computer system, the logical processing unit being one logical processing unit of multiple logical processing units backed by a socket of a plurality of sockets of the multiprocessor computer system. The reallocating includes: monitoring, during execution of program code of the multiple logical processing units, a performance metric of a hardware resource of the socket, the hardware resource being shared by the multiple logical processing units; and reassigning the logical processing unit, based on the monitoring, to a different socket of the plurality of sockets of the multiprocessor computer system to, in part, improve the performance metric of the hardware resource of the socket. The reassigning includes reassigning the logical processing unit based on the monitoring determining that a differential between a resource utilization rate of the socket and a resource utilization rate of the different socket exceeds a set threshold.

In a further aspect, a computer program product is provided for reallocating processing units. The computer program product includes a computer readable storage medium readable by a processing circuit and storing instructions for execution by the processing circuit for performing a method, the method including: reallocating a logical processing unit within a multiprocessor computer system, the logical processing unit being one logical processing unit of multiple logical processing units backed by a socket of a plurality of sockets of the multiprocessor computer system. The reallocating includes: monitoring, during execution of program code of the multiple logical processing units, a performance metric of a hardware resource of the socket, the hardware resource being shared by the multiple logical processing units; and reassigning the logical processing unit, based on the monitoring, to a different socket of the plurality of sockets of the multiprocessor computer system to, in part, improve the performance metric of the hardware resource of the socket. The reassigning includes reassigning the logical processing unit based on the monitoring determining that a differential between a resource utilization rate of the socket and a resource utilization rate of the different socket exceeds a set threshold.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one or more aspects of the present invention, the physical backing of one or more logical processing units of a processing environment may be changed. For example, a socket currently assigned to a logical processing unit (a source socket) may be replaced by another socket (a target socket). The reassignment of the logical processing unit to the another socket may be performed while the source socket initially backing the logical processing unit (i.e., the source socket) is operating (as opposed to failed, checked, or clock-stopped), and transparent to and without the involvement of operating system software or a hypervisor. Reassignment may be concurrently performed for one or more logical processing units.

Figure 1A:
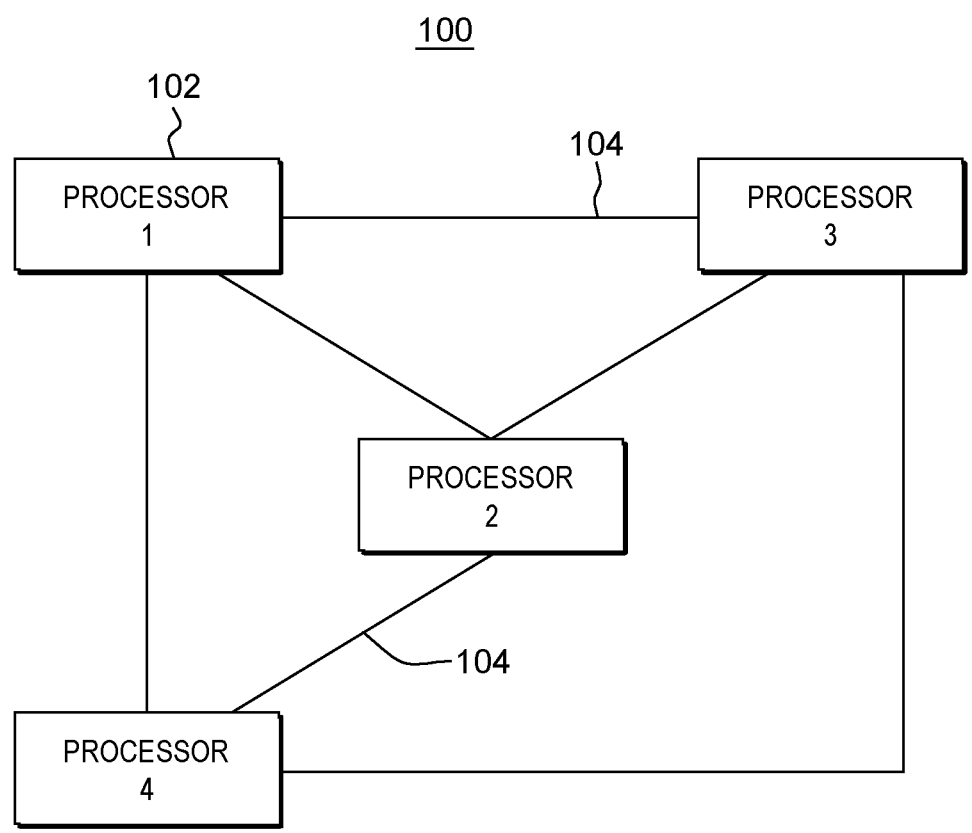
FIG. 1A depicts one embodiment of a processing environment to incorporate and use one or more aspects of the present invention.
Figure 1B:
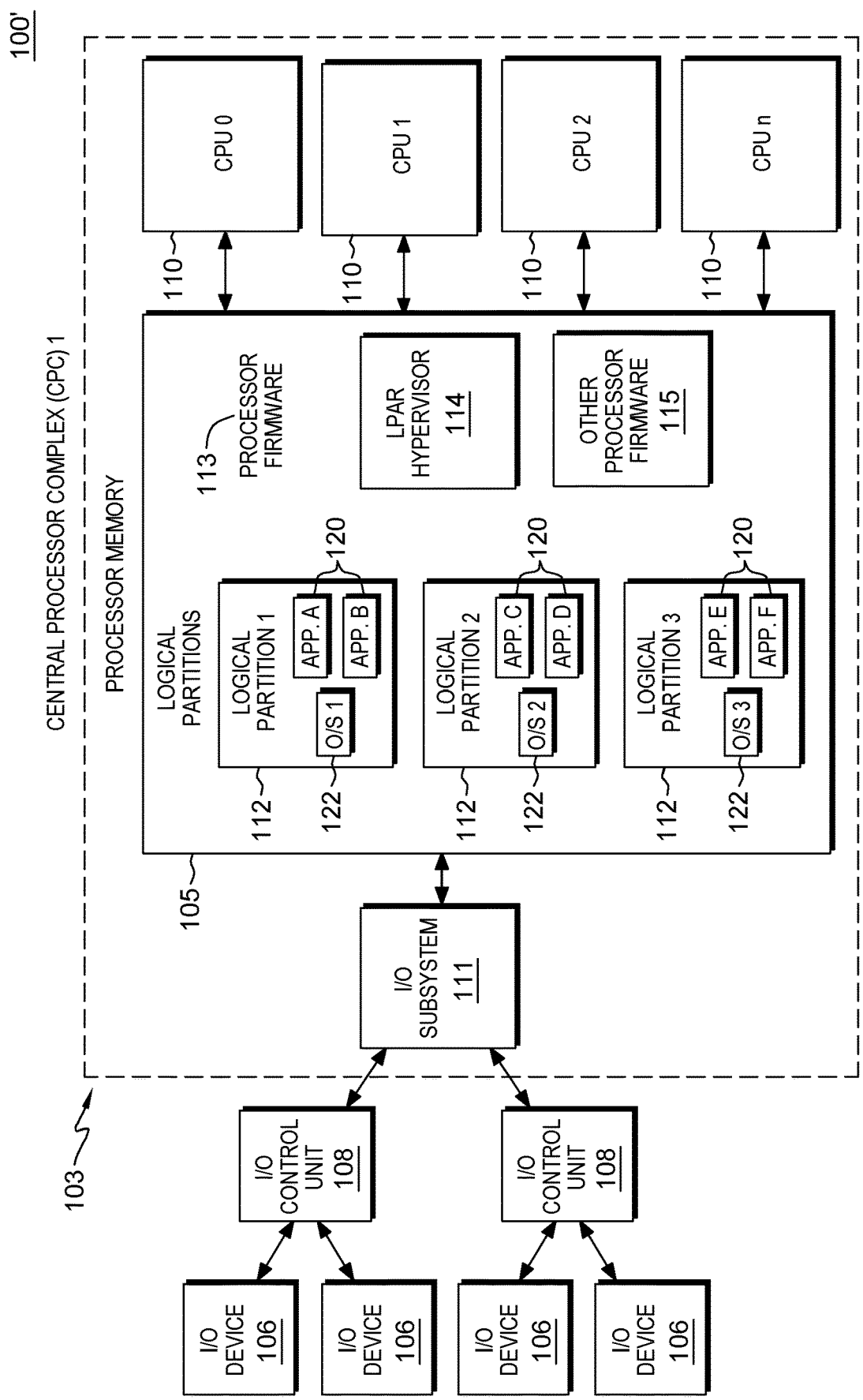
FIG. 1B depicts another embodiment of a processing environment to incorporate and use one or more aspects of the present invention.

Before discussing further the performance-based reallocation (or reassigning) of logical processing units disclosed herein, FIGS. 1A & 1B depict examples of processing environments within which one or more aspects of the present invention may be used. One embodiment of a processing environment to incorporate and use one or more aspects of the present invention is depicted in FIG. 1A. As shown, processing environment 100 may include a plurality of processors 102 coupled to one another via one or more connections 104. Each processor in this example may be a System z® server executing a z/OS® operating system, offered by International Business Machines Corporation) (IBM®). Connection 104 may be, for instance, a token, network connection, cable, or any other type of connection. IBM®, z/Series®, and z/OS® are registered trademarks of International Business Machines Corporation, of Armonk, N.Y., USA. Other names used herein may be registered trademarks, trademarks, or product names of International Business Machines Corporation, or other companies.

Each processor 102 may be viewed as a logical processing unit to its operating system. This logical processing unit, however, is backed by a physical processor or socket to which the processing unit is assigned. The physical assignment of processing units is made, for instance, by the firmware (e.g., millicode) of the environment based on processor type (i.e., CPU, SAP) and/or machine configuration (e.g., layout of physical processors, number of processors or sockets, etc.).

By way of further example, FIG. 1B depicts another computing environment 100', which may incorporate and use one or more aspects of the present invention.

As one example, computing environment 100' may include a central processor complex (CPC) 103 coupled to one or more input/output (I/O) devices 106 via one or more control units 108. Central processor complex 103 includes, for instance, a processor memory 105 (a.k.a., main memory, main storage, central storage) coupled to one or more sockets or physical processors (a.k.a., central processing units (CPUs)) 110, and an input/output subsystem 111, each of which is described below.

Processor memory 105 includes, for example, one or more partitions 112 (e.g., logical partitions), and processor firmware 113, which includes a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system may be the z/OS operating system, the z/VM operating system, the z/Linux operating system, or the TPF operating system, offered by International Business Machines Corporation, Armonk, N.Y. Logical partitions 112 are managed by logical partition hypervisor 114, which may be implemented by firmware running on physical processors or sockets 110. As used herein, firmware includes, e.g., the microcode and/or millicode of the processor. It includes, for instance, the hardware-level instructions and/or data structures used in implementation of higher level machine code. In one embodiment, it may include, for instance, proprietary code that is typically delivered as microcode that includes trusted software or microcode specific to the underlying hardware and controls operating system access to the system hardware.

Each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition.

Input/output subsystem 111 directs the flow of information between input/output devices 106 and main storage 105. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc.

As noted, there are times when it may be necessary or desirable to reallocate or reassign the physical backing of one or more logical processing units. That is, there are times when it may be desirable to change the physical backing of one or more logical processing units. As examples, the System z® computing environment offered by International Business Machines Corporation of Armonk, N.Y., USA, may include spare processing units for availability reasons. In System z®, the complete processor context, including register states, can be saved and restored to enable 'sparing' or moving a logical processing unit to a new physical processor. Should a logical processing unit fail, the system can replace the failing processing unit with a spare logical processing unit rapidly, without any interaction with the currently-running system software, whether hypervisor or operating system. Additionally, System z® includes the capability to remap physical memory so as to change memory location of the absolute memory for a logical processing unit, or for a logical partition. For instance, physical memory can be remapped to be closer to the core(s) most frequently accessing that memory. This remapping can be made transparent to the system software.

Disclosed herein in one or more aspects is a dynamic reassignment facility which (in part) uses, in one or more embodiments, the reassign or change capabilities noted above for other purposes. When a logical processing unit is initially assigned within a multiprocessor computer system, a number of parameters, such as the number of physical processors, memory size, and physical placement of components may be considered. The various software layers (hypervisor, operating system, workload manager, etc.) try during operation to optimize performance from their respective point of view, but there is no feedback used from the system, or hardware level, to optimize during operation the logical-to-physical mapping. This is disadvantageous where the initially assigned placement of a logical processing unit within the multiprocessor computer system is not optimal.

Thus, disclosed herein is a dynamic reallocation process, system, and computer program product which, in part, enhances system performance, without the need for manual adjustments to the computer system. In addition, the logical processing unit monitoring and reassignment processing disclosed is operating system independent, and provides system-wide performance optimization. Performance advantages are provided compared with existing software-based solutions, such as a workload manager, which may implement processor affinity, in combination with load-balancing, but not a system-wide, performance-based, logical-to-physical reallocation, as disclosed herein.

In certain computing environment implementations, such as those for government or finance customers, EAL5-level certification of IT infrastructure may be required. In order to achieve that level of security, it is disallowed that any operating system or logical partition may see performance information from any other logical partition. Thus, instrumentation data for some of the hosted partitions may be considered censored data, which is not allowed to be processed by conventional management applications. The reason for this is that management applications can be monitored by a human (such as a person working for another company, or even a criminal), and instrumentation data may give hints to business activities (such as business transaction rates by a competitor at a given point in time). Therefore, in certain computing environments, such as the above-noted System z® computing environment, a customer is allowed to disable one or more internal interfaces, such as system-wide instrumentation facilities, which provide data that is usually consumed by management applications, such as z/OS® WLM, etc. With disabling of such instrumentation interfaces, management applications such as z/OS® WLM are no longer able to consume the instrumentation data on a system-wide level. However, management logic, which may be part of the computer system hardware, is still operational, and may advantageously be employed to implement dynamic logical processing unit reallocation, in accordance with one or more aspects of the present invention, that is, even in an EAL5-level certified computing environment.

Disclosed herein, in one or more aspects, is a system-wide facility or component beyond the hypervisor and the operating system, which can extract hardware instrumentation data (e.g., cache-miss rate and source-from rates), and use the information to place or reassign logical processing units at certain physical locations or sockets during computer system operation to, for instance, optimize the overall throughput, or the throughput for a particular logical processing unit, or a particular logical partition. This component can work completely independently of the system software, but in one or more embodiments, could have a mode where the hypervisor or the operating system can give priority guidance to the component, for instance, to optimize for a certain partition or processing unit, instead of for the complete system.

Figure 2A:
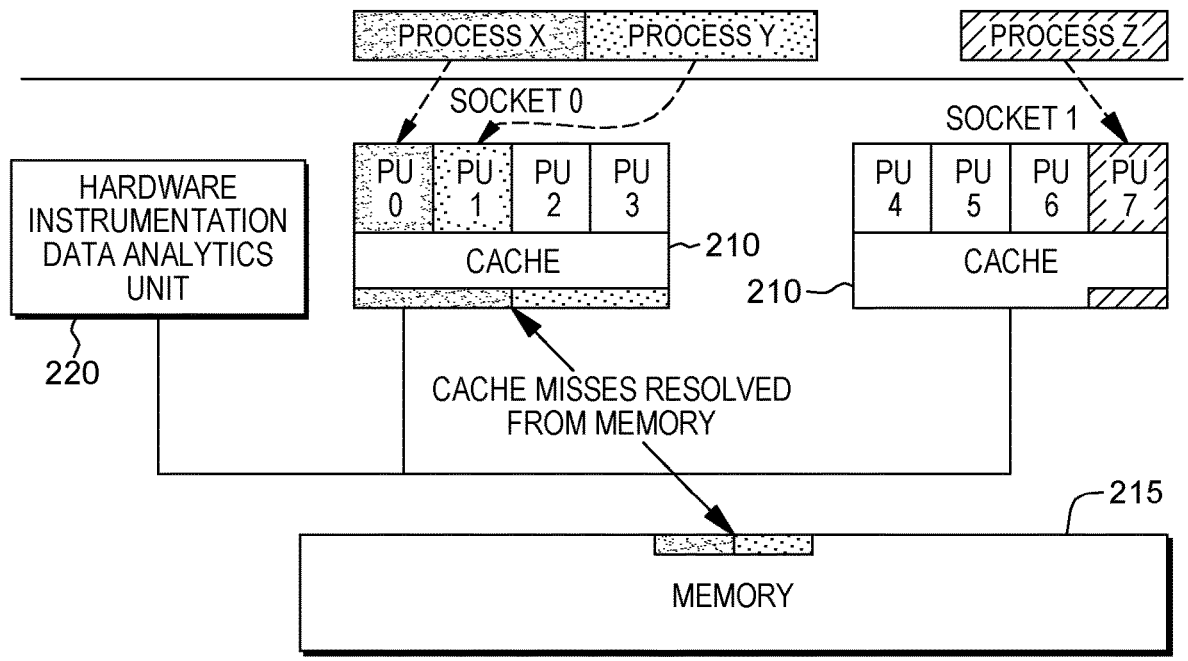
FIG. 2A depicts one embodiment of a multiprocessor computer system, with hardware instrumentation data monitoring to facilitate selective, performance-based reallocation of processing units, in accordance with one or more aspects of the present invention.

By way of example, FIG. 2A depicts one embodiment of a computing environment 200 which includes a plurality of sockets (socket 0, socket 1), or physical processors, as well as associated resources, such as cache memory (for instance, L2 cache). Note in this regard, that a socket may refer to a hardware component containing one or more logical processing units (PUs), interface(s) to main memory, and cache(s) shared between the processing units. A processing unit may be a component capable of executing a computer program independently, containing operational execution units, private cache(s), register files, etc. In one or more implementations, a processing unit refers to a logical processing unit, which is backed by a socket (or physical processor) of the multiprocessor computer system.

As illustrated, each socket may accommodate multiple logical processing units PU0-PU3 and PU4-PU7, respectively, which may be executing processes, such as the depicted process X, process Y, and process Z. A hardware instrumentation data analytics unit 220, such as a service processing unit (SAP), monitors one or more performance metrics of one or more resources, such as cache memory 210, associated with the sockets. By way of example, hardware instrumentation data analytics unit 220 may be or utilize, in one or more embodiments, a monitoring facilities, such as available on the System z®, as well as analytics, such as described herein. In the embodiment depicted, cache-misses resolved from memory 215 may be monitored by hardware instrumentation data analytics unit 220. In this case, two processes, process X on logical processing unit 0 (PUO), and process Y on logical processing unit 1 (PU1) occupy a memory footprint which does not fit within the assigned cache 210 of socket 0. A certain amount of cache-misses are resolved from the slower memory 215 for each process. The hardware instrumentation data analytics unit, which as noted may be a system-wide observer, detects these cache-misses and the source-from rates, and analytics such as described below with reference to FIGS. 3A-3C, may be used to decide to move a logical processing unit (PU1) from one socket to another socket.

Figure 2B:
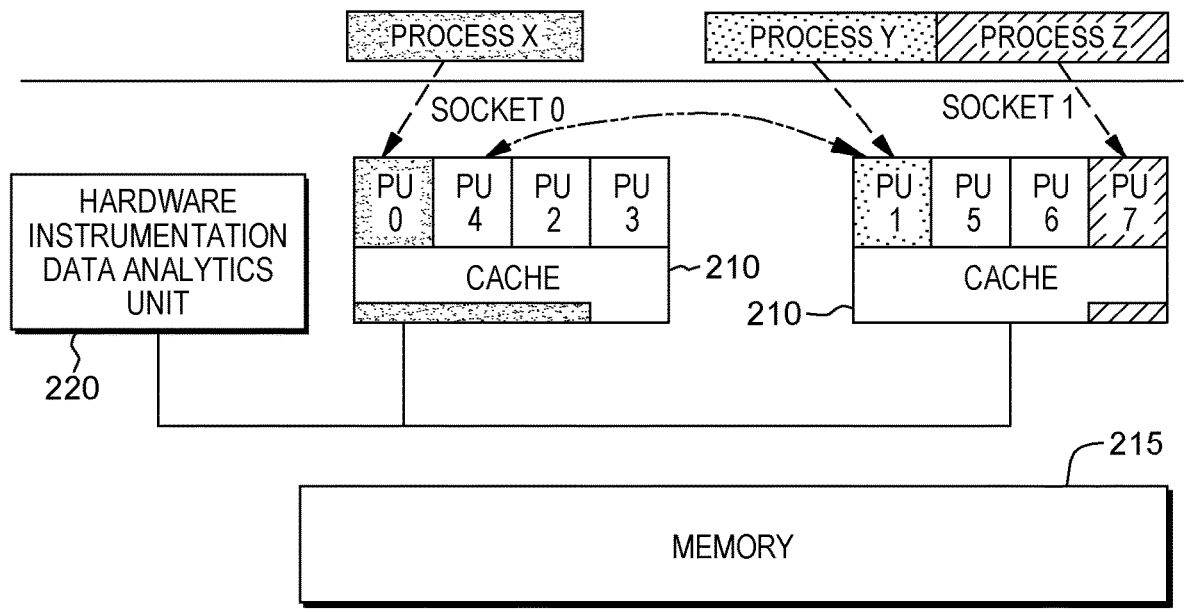
FIG. 2B depicts the multiprocessing computer system of FIG. 2A, with logical processing units PU1 & PU4 shown reassigned between physical sockets, in accordance with one or more aspects of the present invention.

This change or reassignment is illustrated in FIG. 2B, where the logical tophysical assignments for PU1 and PU4 are swapped between socket 0 and socket 1. Note that this change is transparent to the processes, operating system, and hypervisor, in one or more embodiments. As an option, the caches on socket 1 could be pre-loaded with PU1 data prior to moving the logical processing unit. Note, in this regard, that in this example it is assumed that logical processing unit 4 (PU4) is a spare processing unit, and that the swapping of logical processing units between sockets may be implemented using, for instance, the above-discussed sparing feature of the multiprocessor computer system, such as the above-noted System z® sparing capabilities. Similar capabilities are also provided in other computer systems, and described in the art. By way of further explanation, reference Robert Vaupel: "High Availability and Scalability of Mainframe Environments Using System z®", KIT Scientific Publishing (2013), 2.6.1 Transparent CPU Sparing, as well as U.S. Pat. No. 6,189,112. Additionally, hardware instrumentation data analytics unit 220 may be a CPU measurement facility such as the System z® CPU measurement facility, or a similar measurement facility provided by INTEL® Corporation.

Figure 2C:
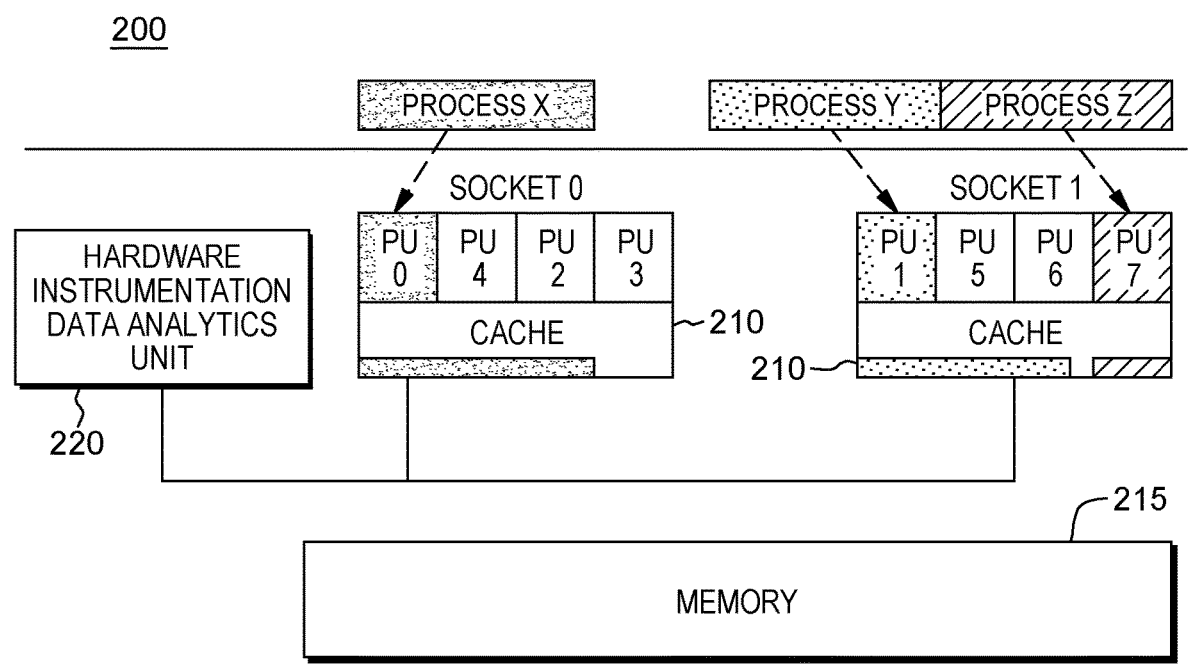
FIG. 2C depicts the multiprocessor computer system of FIGS. 2A & 2B, with program code of the logical processing units being executed and illustrating a reduction in cache-misses resolved from memory, in accordance with one or more aspects of the present invention.

FIG. 2C depicts the computing environment 200 with PU1 running process Y on socket 1, and showing that the cache on socket 1 is now more or higher utilized. The system-wide observer, that is, the hardware instrumentation data analytics unit 220, detects a decrease in cache-misses sourced from memory, and no further activity is needed. Note in this example that process Z running on logical processing unit PU7 is not affected, while process X running on PU0 sees a decrease in cache-misses due to the reassignment of unit PU1 to socket 1.

Figure 3A:
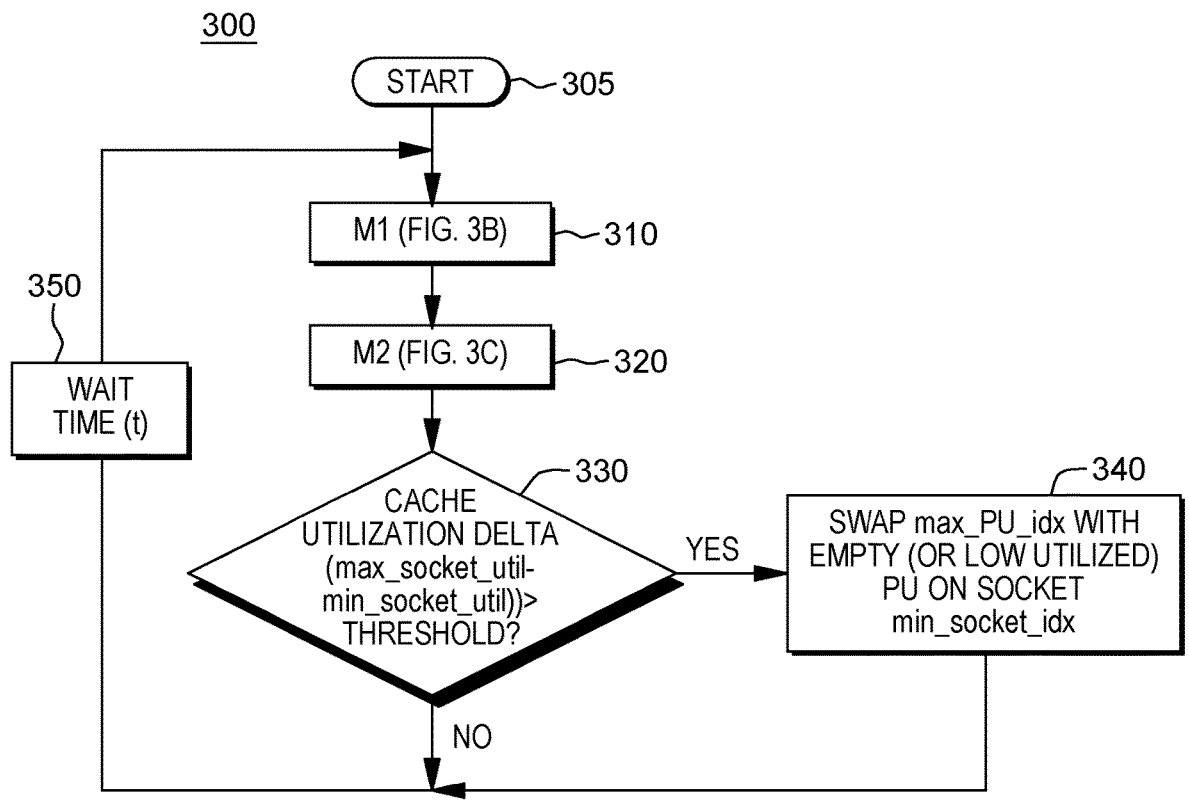
FIGS. 3A-3C depict one embodiment of a process for selectively reallocating logical processing units within a multiprocessor computer system based on system performance data, in accordance with one or more aspects of the present invention.
Figure 3B:
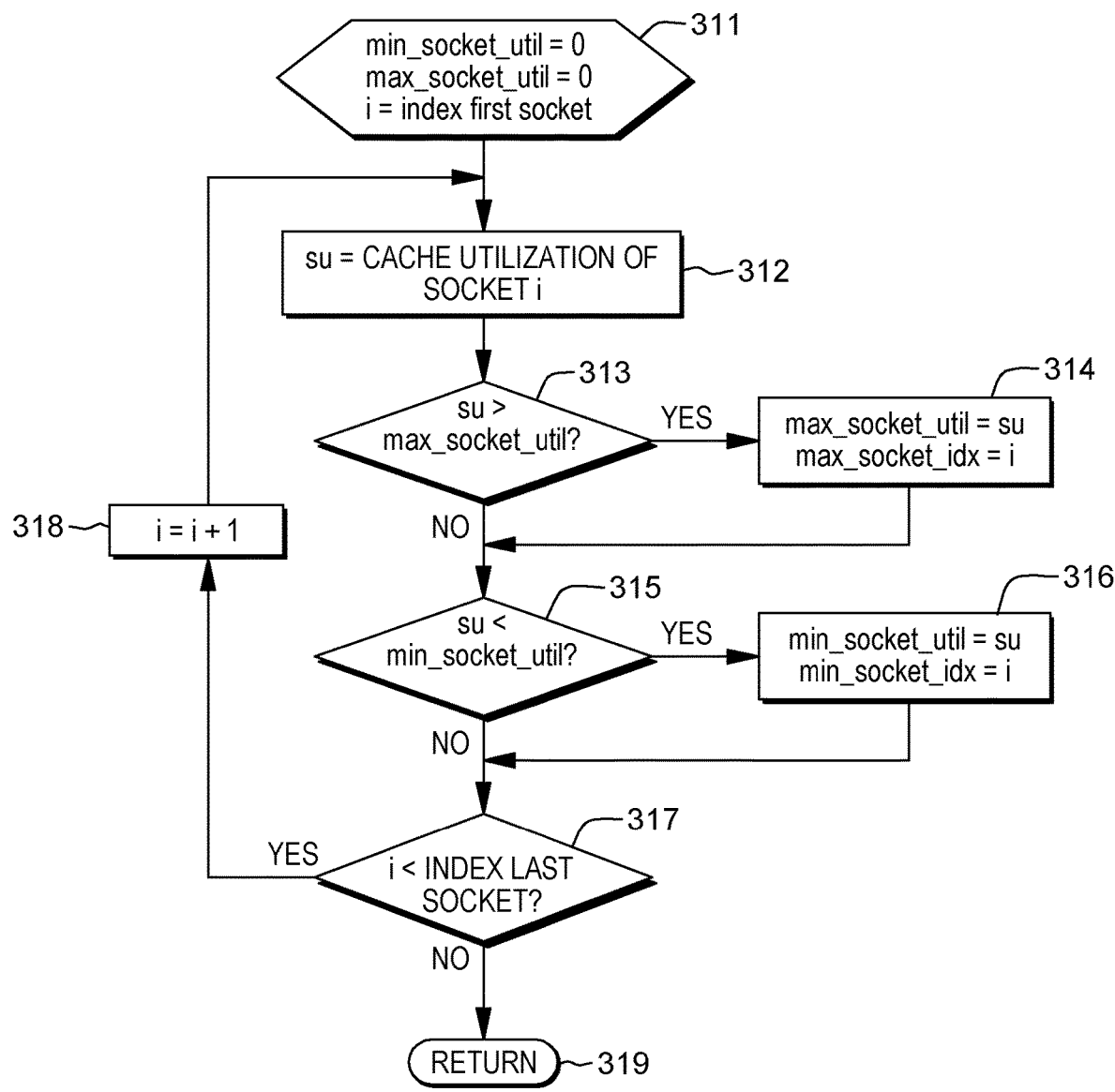
Figure 3C:
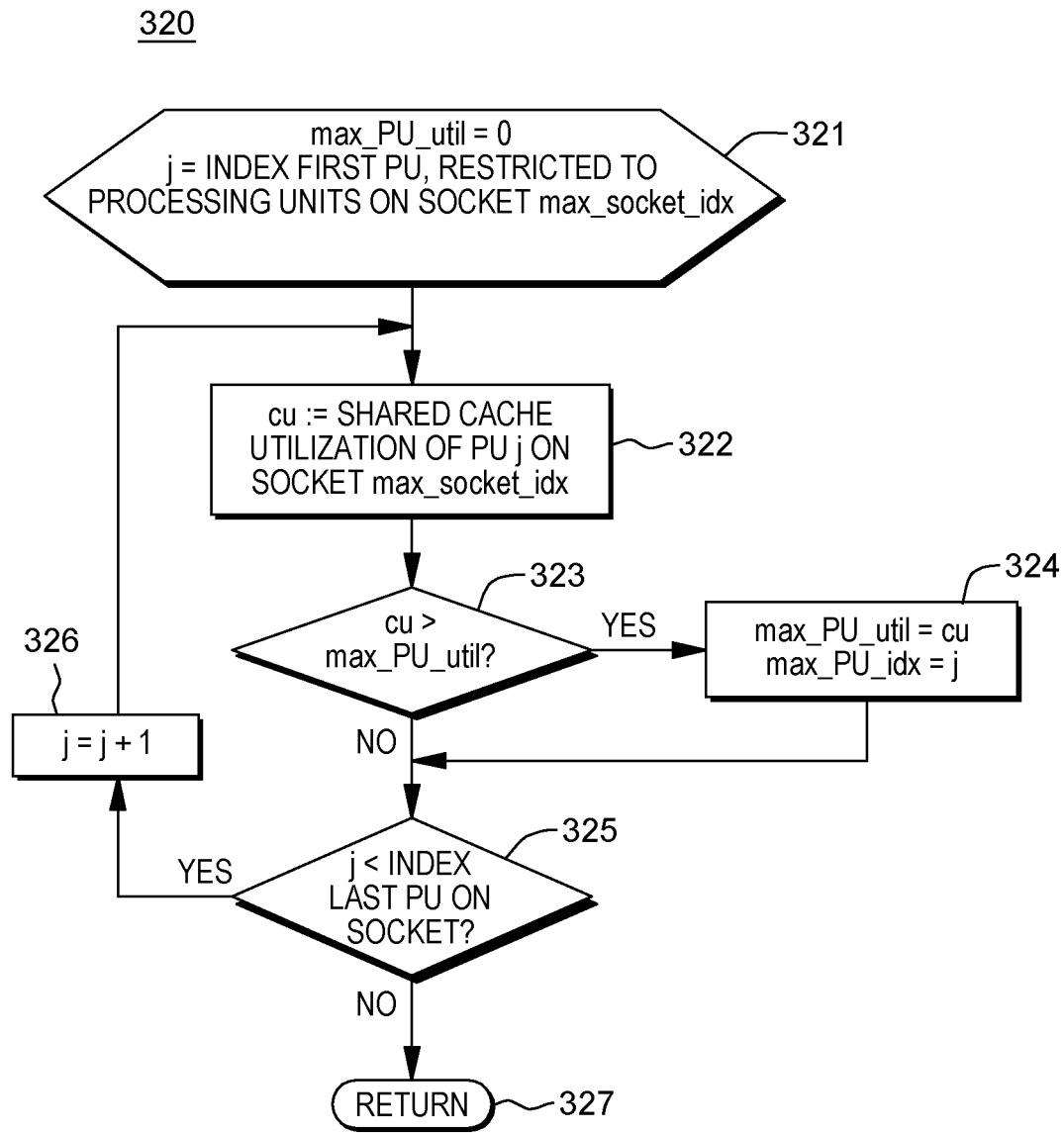

Based on the monitoring of one or more performance metrics of the hardware resources of the sockets of a multiprocessor computer system, analytics processing may be used to determine whether to, for instance, reallocate a logical processing unit to a different socket. FIGS. 3A-3C depict one embodiment of such a process for determining whether to reallocate a logical processing unit, and for identifying the logical processing unit(s) to be reallocated, in accordance with one or more aspects of the present invention.

Referring to FIG. 3A, one embodiment of a process, generally denoted 300, for transparently identifying and moving a logical processing unit is depicted, which starts 305 with executing of a process module M1 310, one embodiment of which is depicted in FIG. 3B.

As shown in FIG. 3B, process module M1 310 identifies the sockets of the multiprocessor computer system with the highest, as well as the lowest, shared cache utilization (in this example). Note that the cache memory is provided as one example only of the hardware resource being monitored, and cache utilization is one example only of the performance metric. Other resources and other performance metrics could be employed in association with the concepts disclosed herein. Variables_min_socket_util and max_socket_util are initialized to zero, and the variable i is set as an index to the first socket of the plurality of sockets to be evaluated 311. The cache utilization of socket i (su) is obtained 312, compared against the current max_socket_util 313. Assuming that the current socket's cache utilization is greater than the max_socket_util, then the variable max_socket_util is updated with socket i's cache utilization, and the max_socket_idx is updated to identify the current socket i 314. Processing next determines whether the current cache utilization of socket i is less than the min_socket_util 315. If so, then the variable min_socket_util is lowered to the cache utilization of the current socket i, and min_socket_idx is updated with an identifier for the current socket i 316. Processing then determines whether any sockets remain to be evaluated, 317. If "yes", then variable i is incremented 318 to the next socket, and the cache utilization for the next socket is obtained 312. Otherwise, processing returns 319 to the process of FIG. 3A.

Once the sockets with the highest and lowest shared cache utilization are identified, then the logical processing unit with the highest shared cache utilization on the socket with the maximum cache utilization (max_socket_idx) is identified using, for instance, the process module M2 of FIG. 3C 320.

As illustrated in FIG. 3C, processing initializes the variable max PU util to zero, and sets the variable j equal to the index of the first logical processing unit (PU) within the socket identified by the max_socket_idx 321. Processing determines the shared cache utilization (cu) of logical processing unit j on socket max_socket_idx 322, and determines whether the shared cache utilization of PU j is greater than a max_PU_util 323. If "yes", then the max_PU_util is updated to the shared cache utilization of PU j, and the max_PU_idx identifier is updated to processing unit j 324. Thereafter, or if the shared cache utilization is not greater than max PU util, processing determines whether there are additional processing units on the socket to be evaluated 325. If "yes", then variable j is incremented 326, and the shared cache utilization of the next processing unit i is obtained. Otherwise, processing is complete, and returns 327 to process 300 of FIG. 3A.

Continuing with the process of FIG. 3A, once the sockets with the highest and lowest shared cache utilization are identified, along with the logical processing unit (PU) having the highest shared cache utilization that is on the highest identified socket, processing determines whether the cache utilization delta between the max_socket_util and the min_socket_util is greater than a set threshold 330. If "yes", then the identified processing unit with the highest shared cache utilization on the socket with the highest cache utilization is swapped or reallocated to a different socket of the multiprocessor computer system by, for instance, swapping max_PU_idx with an empty or low-utilized PU on a different socket, such as the identified socket with the minimum cache utilization min_socket_idx 340. Therefore, processing may wait a time interval t 350 before again repeating the process.

Those skilled in the art will note from the above discussion that the embodiments of FIGS. 2A-3C are provided by way of example only. As a further example, in a multiprocessor computer system with logical partitions, a first logical partition may have a very low cache-miss rate, which is sourced from memory. The memory for this first logical partition may be configured (i.e., hardware mapped) local to this physical node (or socket). A second logical partition may have a much higher cache-miss rate sourced from memory, and the memory for this partition may have been initially configured on a remote node due to constraints present at the time of initialization of the multiprocessor computer system. With this performance-based system observation, the overall throughput of the computer system may be enhanced by moving the physical memory for the first logical partition to a remote node, and the physical memory for the second logical partition to the local node. For the first logical partition, there is no drawback since the cache-miss rate sourced from memory is very low, and for the second logical partition, performance gain is achieved because the cache-miss sourced from the local memory is faster compared with that of remote memory. Using a System z® platform, such memory remapping can be accomplished transparent to the running operating system using the Dynamic Storage Relocation (DMR) facility. As an alternative to the second example, the logical processing units (PUs) could be moved to the remote node, where the memory is located, instead of the memory mapping change. To achieve a best alternative, a system-wide view of the performance in hardware instrumentation data is required.

Figure 4A:
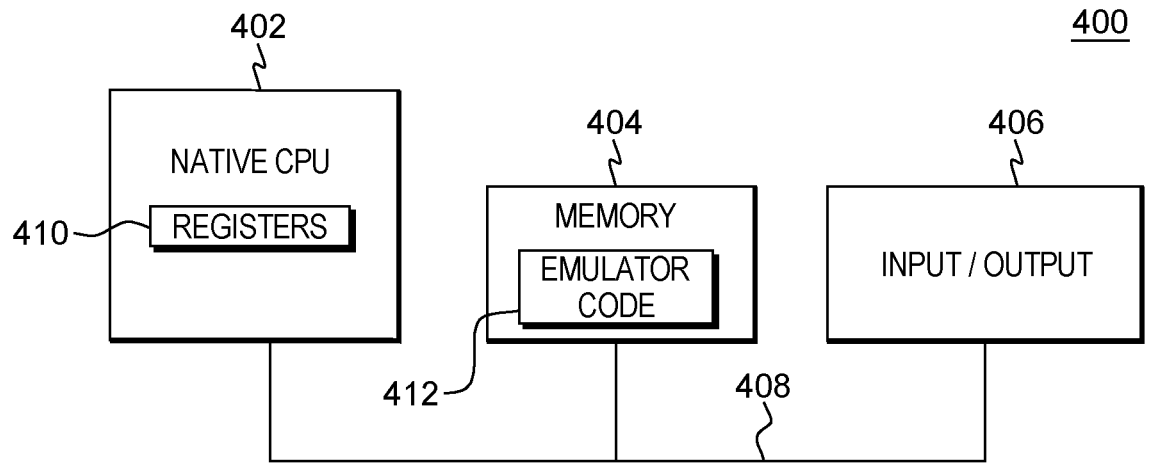
FIG. 4A depicts another example of a computing environment, which may incorporate and use one or more aspects of the present invention.

Another embodiment of a computing environment which may incorporate and use one or more aspects of the reallocation facility described herein is depicted in FIG. 4A. In this example, a computing environment 400 includes, for instance, a native central processing unit (CPU) 402, a memory 404, and one or more input/output devices and/or interfaces 406 coupled to one another via, for example, one or more buses 408 and/or other connections. As examples, computing environment 400 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 402 includes one or more native registers 410, such as one or more general purpose registers and/or one or more special purpose registers used during processing within the environment. These registers include information that represents the state of the environment at any particular point in time.

Moreover, native central processing unit 402 executes instructions and code that are stored in memory 404. In one particular example, the central processing unit may execute emulator code 412 stored in memory 404. This code enables the computing environment configured in one architecture to emulate one or more other architectures. For instance, emulator code 412 allows machines based on architectures other than the z/Architecture, such as PowerPC processors, Power Systems servers, HP Superdome servers or others, to emulate the z/Architecture® (and/or ESA/390) and to execute software and instructions developed based on the z/Architecture®.

Figure 4B:
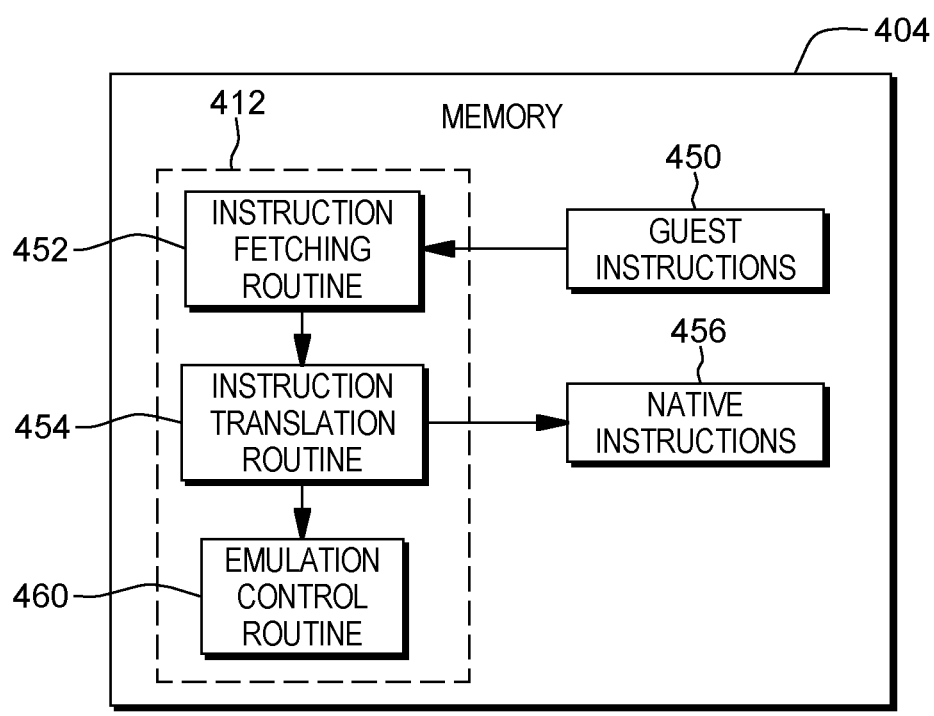
FIG. 4B depicts further details of the memory of FIG. 4A, in accordance with one or more aspects of the present invention.

Further details relating to emulator code 412 are described with reference to FIG. 4B. Guest instructions 450 stored in memory 404 comprise software instructions (e.g., correlating to machine instructions) that were developed to be executed in an architecture other than that of native CPU 402. For example, guest instructions 450 may have been designed to execute on a z/Architecture® processor, but instead, are being emulated on native CPU 402, which may be, for example, an Intel Itanium II processor. In one example, emulator code 412 includes an instruction fetching routine 452 to obtain one or more guest instructions 450 from memory 404, and to optionally provide local buffering for the instructions obtained. It also includes an instruction translation routine 454 to determine the type of guest instruction that has been obtained and to translate the guest instruction into one or more corresponding native instructions 456. This translation includes, for instance, identifying the function to be performed by the guest instruction and choosing the native instruction(s) to perform that function.

Further, emulator code 412 includes an emulation control routine 460 to cause the native instructions to be executed. Emulation control routine 460 may cause native CPU 402 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 456 may include loading data into a register from memory 404; storing data back to memory from a register; or performing some type of arithmetic or logic operation, as determined by the translation routine.

Each routine is, for instance, implemented in software, which is stored in memory and executed by native central processing unit 402. In other examples, one or more of the routines or operations are implemented in firmware, hardware, software or some combination thereof. The registers of the emulated processor may be emulated using registers 410 of the native CPU or by using locations in memory 404. In embodiments, guest instructions 450, native instructions 456 and emulator code 412 may reside in the same memory or may be disbursed among different memory devices.

Exemplary embodiments of computing environments to implement one or more aspects of the present invention are described below with reference to FIGS. 5-7.

Figure 5:
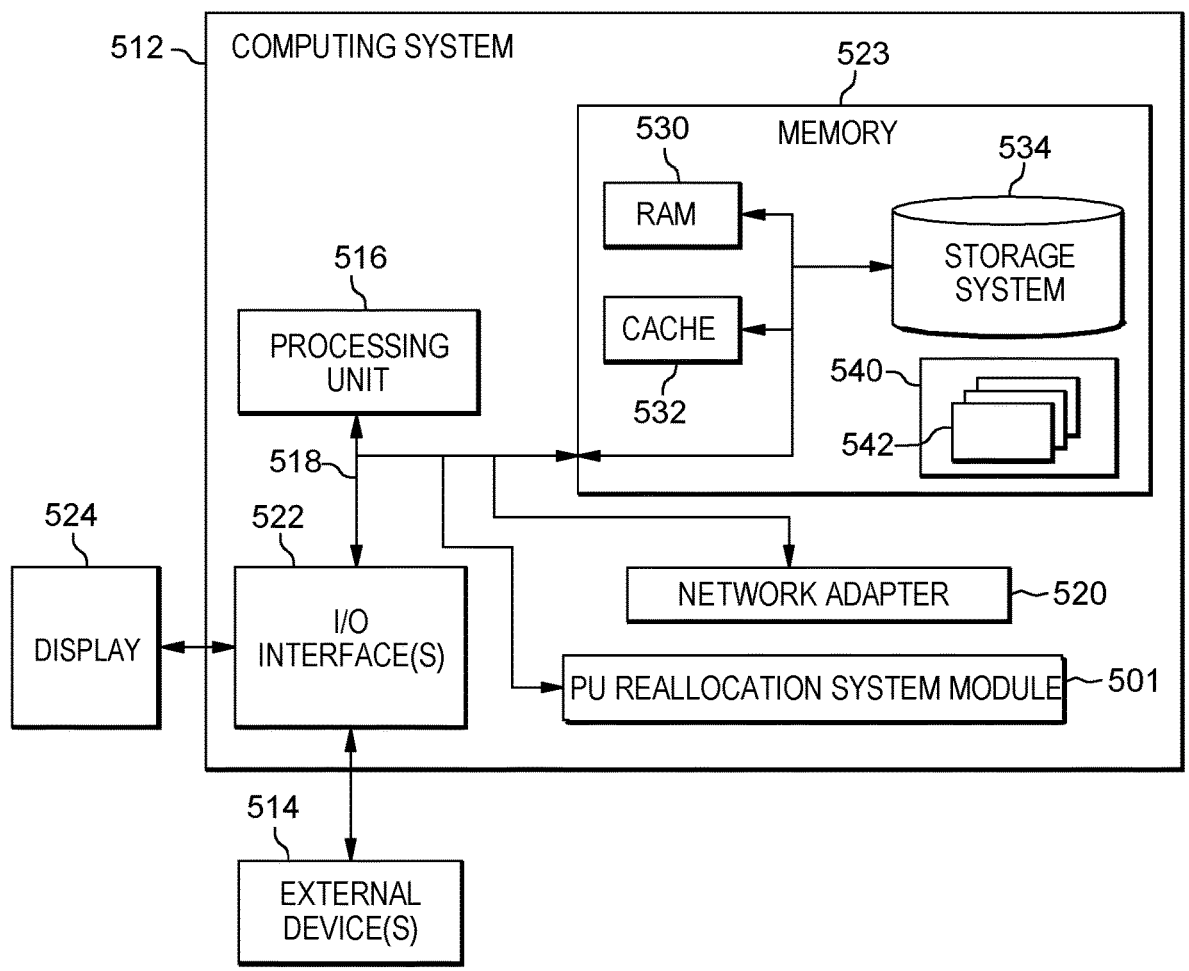
FIG. 5 depicts a further embodiment of a computing system which may incorporate selective reallocation of logical processing units, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a desktop computer, a workstation, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA® Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate, processing unit reassignment system, module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
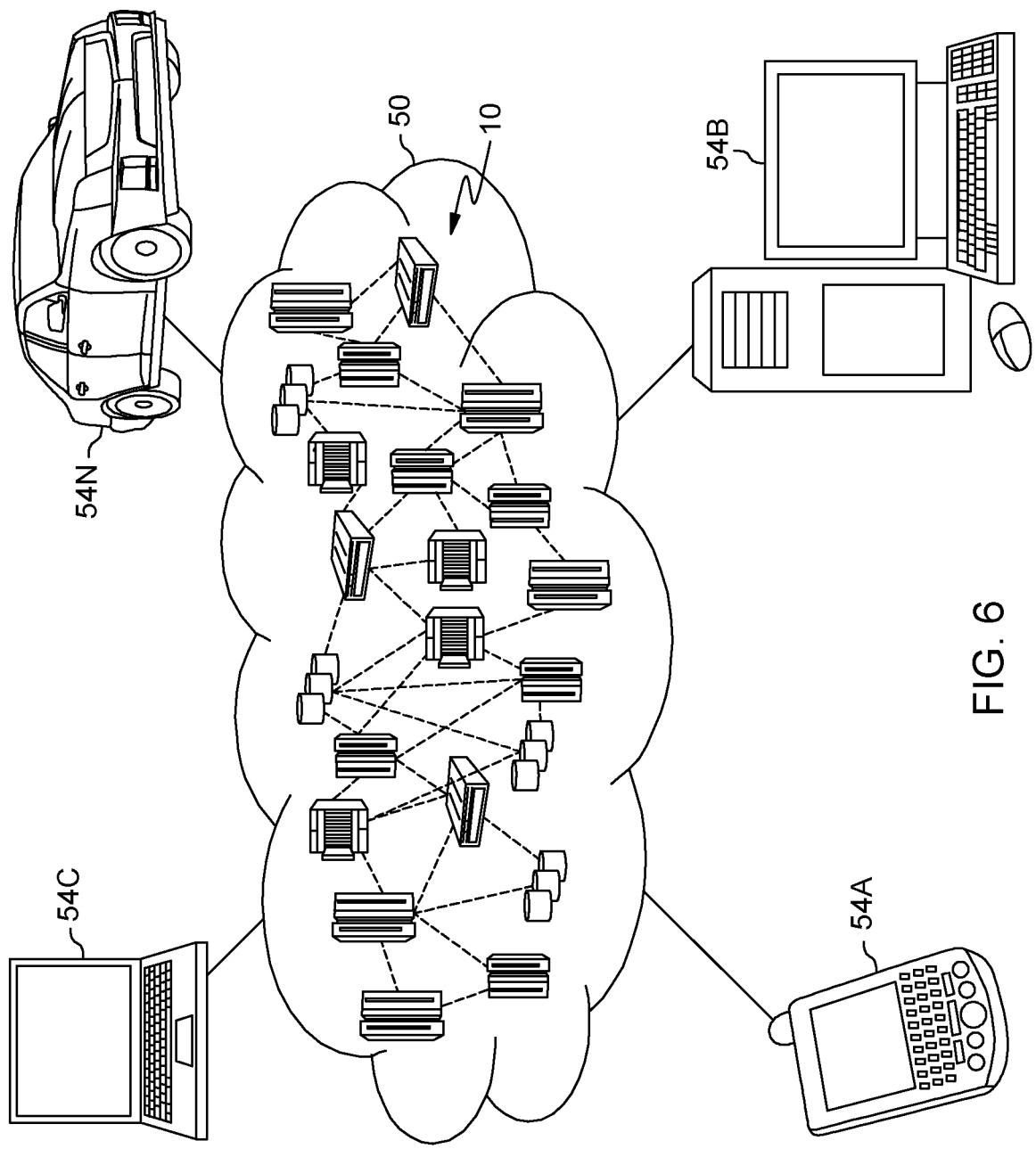
FIG. 6 depicts one embodiment of a cloud computing environment, which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
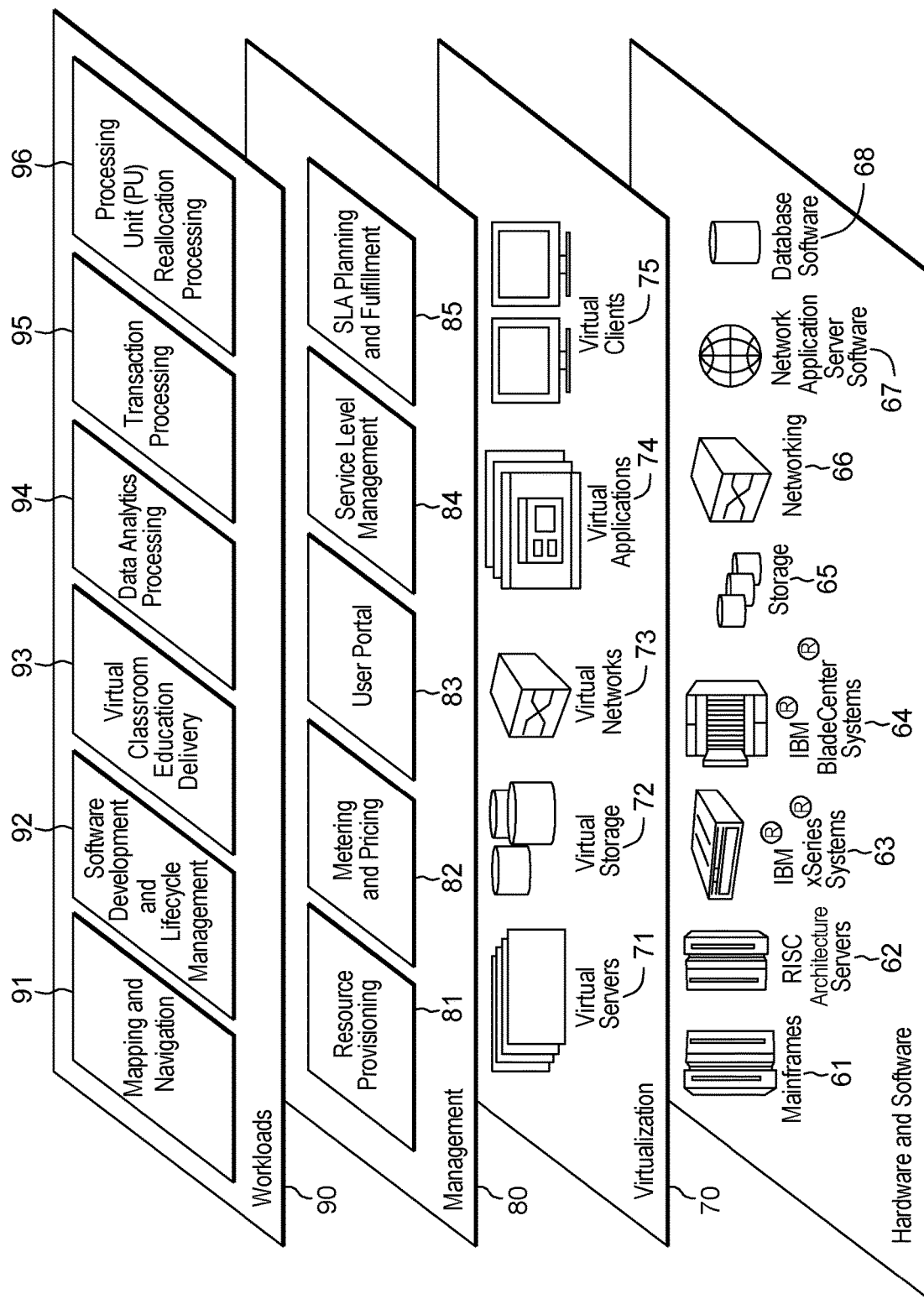
FIG. 7 depicts an example of an extraction model layers, which may facilitate implementing selective reallocation of logical processing units, in accordance with one or more aspects of the present invention.

Referring to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing unit (PU) reassignment processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
reallocating a logical processing unit within a multiprocessor computer system, the logical processing unit being one logical processing unit of multiple logical processing units backed by a socket of a plurality of sockets of the multiprocessor computer system, the reallocating comprising:
monitoring, during execution of program code of the multiple logical processing units, a performance metric of a hardware resource of the socket, the hardware resource being shared by the multiple logical processing units; and
reassigning the logical processing unit, based on the monitoring, to a different socket of the plurality of sockets of the multiprocessor computer system to, in part, improve the performance metric of the hardware resource of the socket, the reassigning comprising reassigning the logical processing unit based on the monitoring determining that a differential between a resource utilization rate of the socket and a resource utilization rate of the different socket exceeds a set threshold, and the reassigning being without involvement of the logical processing unit, and without involvement of an operating system and a hypervisor of the multiprocessor computer system.

2. The computer-implemented method of claim 1, wherein the socket comprises a source socket, and the different socket comprises a target socket, and wherein the hardware resource is a source resource, and the target socket has a target resource associated therewith, the target resource being a same type of resource as the source resource.

3. The computer-implemented method of claim 2, wherein the source socket and the target socket each comprise management circuitry operable for storing to and loading from a memory block a serialized representation of an architected state of the logical processing unit, the architected state describing a momentary internal execution state of the logical processing unit while executing program code, and the reassigning comprises instructing the management circuitry of the source socket to store the architected state, and instructing the management circuitry of the target socket to load the stored architected state.

4. The computer-implemented method of claim 1, wherein the hardware resource comprises a cache memory shared by the multiple logical processing units backed by the socket.

5. The computer-implemented method of claim 4, wherein the performance metric comprises a cache-miss rate of the cache memory.

6. The computer-implemented method of claim 1, wherein the monitoring is performed by a monitoring unit that is part of a separate logical processing unit dedicated to system management tasks of the multiprocessor computer system.

7. The computer-implemented method of claim 1, wherein the monitoring is performed by a monitoring unit that comprises a service processing unit (SAP) separate from the plurality of sockets of the multiprocessor computer system.

8. A system for reallocating processing units, the system comprising:
a memory; and
a processing circuit communicatively coupled with the memory, wherein the system performs a method comprising:
reallocating a logical processing unit within a multiprocessor computer system, the logical processing unit being one logical processing unit of multiple logical processing units backed by a socket of a plurality of sockets of the multiprocessor computer system, the reallocating comprising:
monitoring, during execution of program code of the multiple logical processing units, a performance metric of a hardware resource of the socket, the hardware resource being shared by the multiple logical processing units; and
reassigning the logical processing unit, based on the monitoring, to a different socket of the plurality of sockets of the multiprocessor computer system to, in part, improve the performance metric of the hardware resource of the socket, the reassigning comprising reassigning the logical processing unit based on the monitoring determining that a differential between a resource utilization rate of the socket and a resource utilization rate of the different socket exceeds a set threshold, and the reassigning being without involvement of the logical processing unit, and without involvement of an operating system and a hypervisor of the multiprocessor computer system.

9. The system of claim 8, wherein the socket comprises a source socket, and the different socket comprises a target socket, and wherein the hardware resource is a source resource, and the target socket has a target resource associated therewith, the target resource being a same type of resource as the source resource.

10. The system of claim 9, wherein the source socket and the target socket each comprise management circuitry operable for storing to and loading from a memory block a serialized representation of an architected state of the logical processing unit, the architected state describing a momentary internal execution state of the logical processing unit while executing program code, and the reassigning comprises instructing the management circuitry of the source socket to store the architected state, and instructing the management circuitry of the target socket to load the stored architected state.

11. The system of claim 8, wherein the hardware resource comprises a cache memory shared by the multiple logical processing units backed by the socket.

12. The system of claim 11, wherein the performance metric comprises a cache-miss rate of the cache memory.

13. The system of claim 8, wherein the monitoring is performed by a monitoring unit that comprises a service processing unit (SAP) separate from the plurality of sockets of the multiprocessor computer system.

14. A computer program product for reallocating processing units, the computer program product comprising:
a computer readable storage medium readable by a processing circuit and storing instructions for execution by the processing circuit for performing a method comprising:

reallocating a logical processing unit within a multiprocessor computer system, the logical processing unit being one logical processing unit of multiple logical processing units backed by a socket of a plurality of sockets of the multiprocessor computer system, the reallocating comprising:

monitoring, during execution of program code of the multiple logical processing units, a performance metric of a hardware resource of the socket, the hardware resource being shared by the multiple logical processing units; and reassigning the logical processing unit, based on the monitoring, to a different socket of the plurality of sockets of the multiprocessor computer system to, in part, improve the performance metric of the hardware resource of the socket, the reassigning comprising reassigning the logical processing unit based on the monitoring determining that a differential between a resource utilization rate of the socket and a resource utilization rate of the different socket exceeds a set threshold, and the reassigning being without involvement of the logical processing unit, and without involvement of an operating system and a hypervisor of the multiprocessor computer system.

15. The computer program product of claim 14, wherein the socket comprises a source socket, and the different socket comprises a target socket, and wherein the hardware resource is a source resource, and the target socket has a target resource associated therewith, the target resource being a same type of resource as the source resource.

16. The computer program product of claim 15, wherein the source socket and the target socket each comprise management circuitry operable for storing to and loading from a memory block a serialized representation of an architected state of the logical processing unit, the architected state describing a momentary internal execution state of the logical processing unit while executing program code, and the reassigning comprises instructing the management circuitry of the source socket to store the architected state, and instructing the management circuitry of the target socket to load the stored architected state.

17. The computer program product of claim 14, wherein the hardware resource comprises a cache memory shared by the multiple logical processing units backed by the socket.

18. The computer program product of claim 17, wherein the performance metric comprises a cache-miss rate of the cache memory.

* * * * *